(12) United States Patent
Bennett et al.

(10) Patent No.: US 6,314,417 B1
(45) Date of Patent: Nov. 6, 2001

(54) PROCESSING MULTIPLE DATABASE TRANSACTIONS IN THE SAME PROCESS TO REDUCE PROCESS OVERHEAD AND REDUNDANT RETRIEVAL FROM DATABASE SERVERS

(75) Inventors: John G. Bennett, Bellevue; Ketan Dalal, Seattle, both of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/042,321

(22) Filed: Mar. 13, 1998

Related U.S. Application Data

(62) Division of application No. 08/752,218, filed on Nov. 19, 1996, now Pat. No. 5,835,908.

(51) Int. Cl.[7] .................................................. G06F 17/30
(52) U.S. Cl. ........................... 707/2; 707/3; 707/10; 707/103; 707/205; 395/472; 395/800.01
(58) Field of Search .................................. 707/103, 526, 707/3, 2, 10, 205; 395/472, 800.01; 709/205

(56) References Cited

U.S. PATENT DOCUMENTS

| | | | |
|---|---|---|---|
| 5,023,776 | 6/1991 | Gregor | 364/200 |
| 5,241,641 | 8/1993 | Iwasa et al. | 395/425 |
| 5,261,066 | 11/1993 | Jouppi et al. | 395/425 |
| 5,276,848 | 1/1994 | Gallagher et al. | 395/425 |
| 5,307,477 | 4/1994 | Taylor et al. | 395/425 |
| 5,369,778 * | 11/1994 | Soucie et al. | 707/103 |
| 5,386,547 | 1/1995 | Jouppi | 395/425 |
| 5,542,062 | 7/1996 | Taylor et al. | 395/403 |
| 5,544,353 * | 8/1996 | Forman et al. | 707/2.3 |
| 5,584,013 | 12/1996 | Cheong et al. | 395/449 |
| 5,596,745 * | 1/1997 | Lai et al. | 707/103 |
| 5,617,568 | 4/1997 | Ault et al. | 395/612 |
| 5,666,546 * | 9/1997 | Donnan | 395/472 |
| 5,680,571 | 10/1997 | Bauman | 395/449 |
| 5,694,573 | 12/1997 | Cheong et al. | 395/449 |
| 5,706,506 * | 1/1998 | Jensen et al. | 707/103 |
| 5,717,919 | 2/1998 | Kodavalla et al. | 395/608 |
| 5,781,732 * | 7/1998 | Adams | 709/205 |
| 5,787,300 * | 7/1998 | Wijaya | 395/800.01 |
| 5,860,074 * | 1/1999 | Rowe et al. | 707/526 |
| 5,884,316 * | 3/1999 | Bernstein et al. | 707/103 |

OTHER PUBLICATIONS

Gray, Jim et al., *Transaction Processing: Concepts and Techniques*, Morgan Kaufmann Publishers, Inc., San Francisco, CA, 1993.

Truman, Joe, "COMA–F: A Non–Hierarchical Cache Only Memory Architecture," A Dissertation submitted to the Department of Electrical Engineering and the Committee on Graduate Studies of Stanford University, Stanford University, 1995, pp. 1–110.

* cited by examiner

*Primary Examiner*—Wayne Amsbury
*Assistant Examiner*—Thuy Pardo
(74) *Attorney, Agent, or Firm*—Schwegman, Lundberg, Woessner & Kluth, P.A.

(57) ABSTRACT

The present invention uses a segmented caching data structure to cache database objects provided by a database server. The database server provides database objects in response to requests by a number of different programs. The segmented caching data structure is made up of a single central cache and a number of program caches, each corresponding to one of the programs. When a database object is provided by the database server in response to a request by any of the programs, a copy of the database object is stored in the central cache. Another copy of the object is stored in the program cache for the program that requested the database object. When the segmented caching data structure is maintained in this manner, when a request is made by one of the programs a copy of the requested object stored in either of the central cache or the program cache for the program may be used, making it unnecessary for the database server to provide the requested database object.

7 Claims, 15 Drawing Sheets

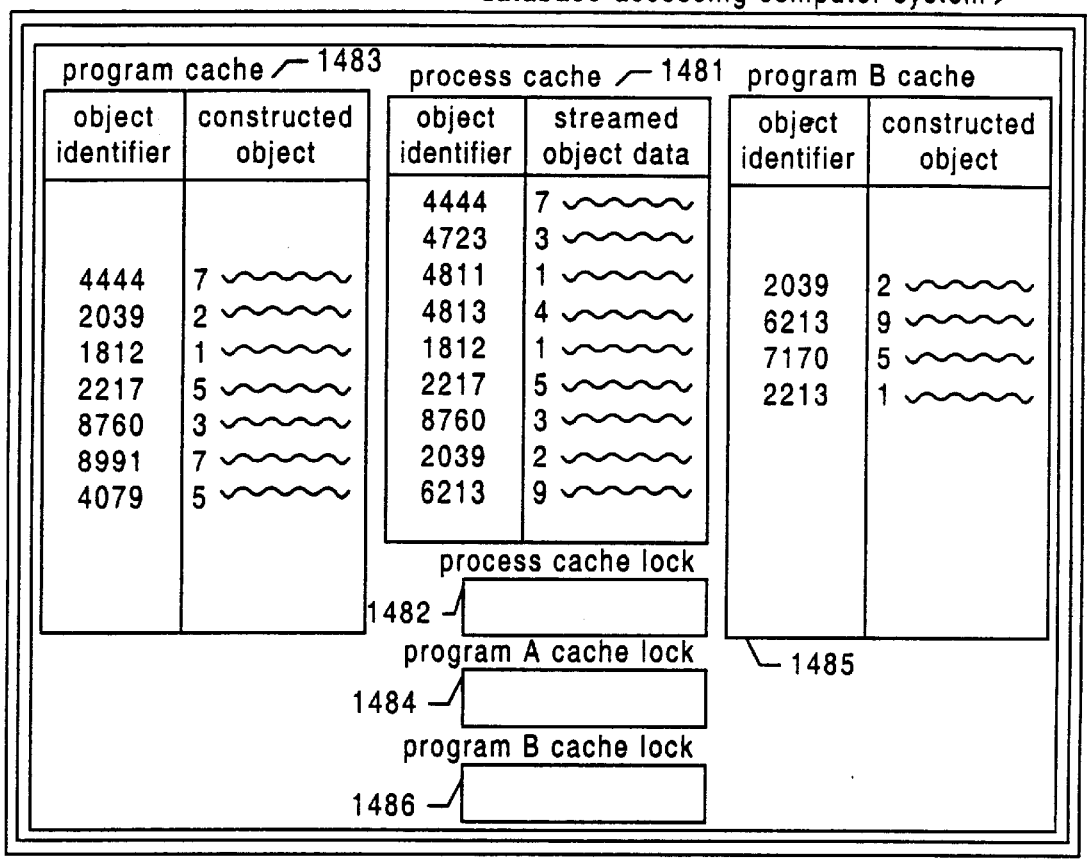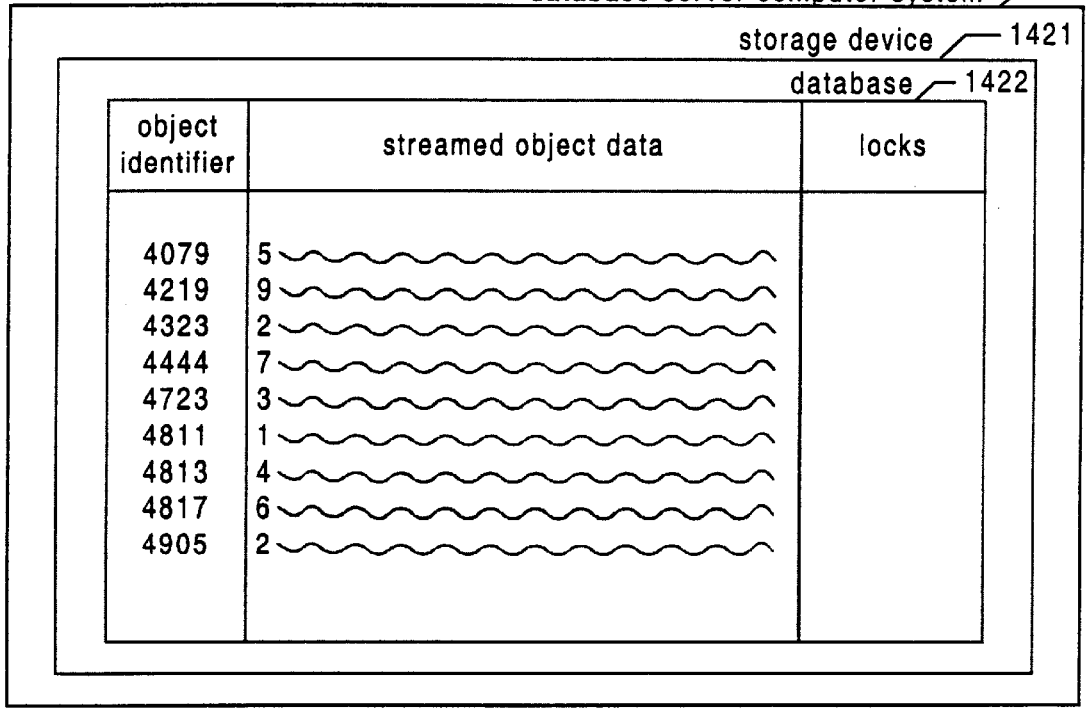
Fig. 14

PROCESSING MULTIPLE DATABASE TRANSACTIONS IN THE SAME PROCESS TO REDUCE PROCESS OVERHEAD AND REDUNDANT RETRIEVAL FROM DATABASE SERVERS

CROSS-REFERENCE TO RELATED APPLICATION

This application is a Divisional of U.S. patent application Ser. No. 08/752,218, filed Nov. 19, 1996, now U.S. Pat. No. 5,835,908.

TECHNICAL FIELD

The invention relates generally to the fields of database transaction processing and caching the results of retrieval requests.

BACKGROUND OF THE INVENTION

It is common to use databases to store significant quantities of data, especially in cases in which the data is shared by a number of database-accessing programs. Database-accessing programs that access data in a database may be executed on a number of different connected computer system. These programs issue a series of database transactions, each corresponding to one or more operations on the database, including read and write operations.

When two or more such programs are executed on the same computer system, they are typically each executed in a separate process. Each process corresponds to a set of resources provided by the operating system, most notably an addressable a range of memory, that is available only to programs ("threads") running within the process. Database-accessing programs are generally each executed in a separate process to prevent them from corrupting each other's data. Because database-accessing programs executing in separate processes cannot share data, the results of a read operation obtained by one database-accessing program are unavailable to other database-accessing programs that issue the same read operations. Indeed, because each database-accessing program typically discards the results of read operation performed as part of a transaction when the transaction completes, a single database-accessing program may have to issue the same read operation two or more times in a short period of time. These redundant transactions again must be applied directly against the database, which has significant time cost. First, the database-accessing program must transmit the transaction across a network to the computer system containing the database, which can take a substantial amount of time. Further, the to actually apply the transaction against the database, the database-accessing program must obtain the appropriate locks, or access controls, on the database, which can involve further network communication and synchronization with database-accessing programs executing on still other computer systems.

Further, because each process has an extensive set of resources devoted to it, the operations of creating and destroying processes each have significant time cost. In the conventional approach of executing each database-accessing program in a separate process, this significant time cost is incurred any time an database-accessing program begins or ends execution. In addition, many of the kinds resources devoted to separate processes are scarce, and allocating shares of these kinds of resources to each of a large number of processes further degrades the performance of the computer system and limits the number of other programs that can simultaneously execute on the computer system.

Given the significant disadvantages of the conventional approach to executing database database-accessing programs, an alternative approach to executing database programs that reduces redundant retrieval from database servers and reduces process overhead would have significant utility.

SUMMARY OF THE INVENTION

In accordance with the present invention a database object caching facility ("the facility") maintains a hierarchy of caches that enables database-accessing programs processing database transactions to share retrieved database objects across database transactions, reducing process overhead and redundant retrieval from database servers, while still maintaining read-repeatable transactional isolation. "Database objects" as used herein means any unit of data that may be retrieved from a database including tables, fields, files, programmatic objects, and other units of data.

The facility executes multiple database-accessing programs in the same process, and utilizes a hierarchy of caches to cache database objects retrieved from a database server. The hierarchy of caches includes one program cache for each database-accessing program, and a single process cache. The facility uses each program cache to store database objects recently retrieved by the cache's database-accessing program, and uses the process cache to store database objects recently retrieved by any of the database-accessing programs. The program caches each allow a database-accessing program to quickly obtain a database object retrieved earlier by the same database-accessing program. The process cache, on the other hand, allows a database-accessing program to quickly obtain a database object recently retrieved by other database-accessing programs. The hierarchy of caches may optionally include additional caches.

BRIEF DESCRIPTION OF THE DRAWINGS

FIG. 1 is an overview block diagram showing the network of computer systems that the facility preferably operates on.

FIG. 14 is a memory diagram showing the results of performing step 1205.

DETAILED DESCRIPTION OF THE INVENTION

Figure 1:
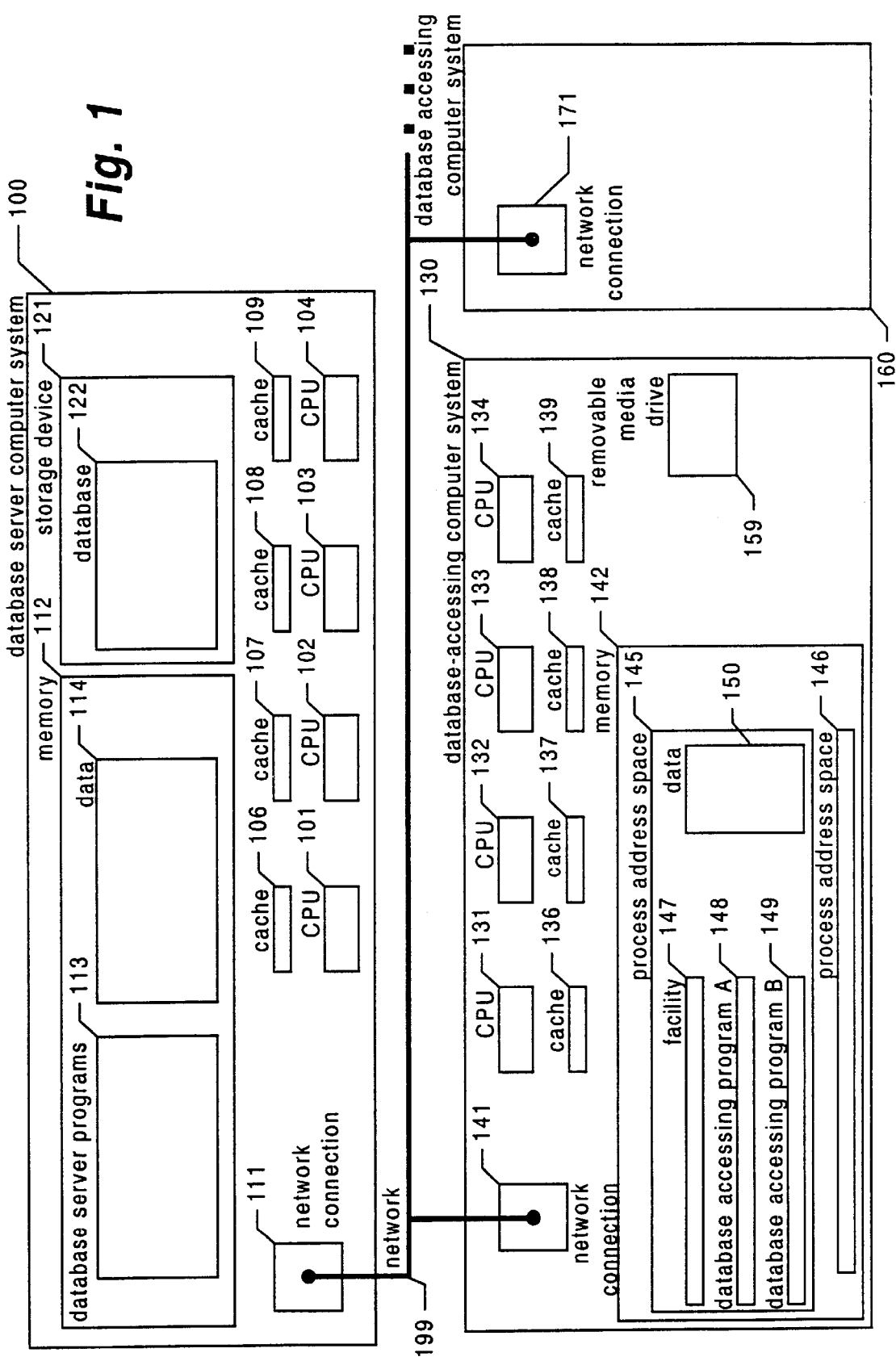

In accordance with the present invention, a database object caching facility ("facility") maintains a hierarchy of caches that enables database-accessing programs processing database transactions to share retrieved database objects across database transactions, reducing process overhead and redundant retrieval from database servers, while still maintaining read-repeatable transactional isolation. (Read-repeatable transactional isolation is a property of database systems according to which a database accessing program can only retrieve committed versions of database objects and no other transaction that modifies any of such objects is permitted to commit until the database-accessing program has completed.) "Database objects" as used herein means any unit of data that may be retrieved from a database including tables, fields, files, programmatic objects, and other units of data. The invention addresses the execution of multiple database-accessing programs, which each produce a stream of related database transactions, each involving one or more database operations.

According to the invention, several database-accessing programs are executed in a single process, allowing database objects and other data to be shared between these programs. In a preferred embodiment, a number of such processes each execute several database-accessing programs. Database-accessing programs each have their own program cache for caching retrieved database objects. The invention preferably maintains the contents of the program cache for subsequent transactions processed by the same program, which have a significant likelihood of using at least some of the objects used by foregoing transactions. Another cache, called the process cache, caches all of the database objects retrieved by any of the database-accessing programs in the process. The process cache, too, is maintained across individual transactions. When a transaction being processed by one of the database-accessing programs needs a database object, the facility first searches the program cache for the database-accessing program and, if the program cache contains the database objects, the database-accessing program accesses it in its program cache. If the database-accessing program's program cache does not contain the needed database object, the database-accessing facility searches the process cache for the needed object, and, if the process cache contains the needed database object, copies it to the program cache where the database-accessing program can access it and make changes to it without affecting the version of the database object used by other database-accessing programs in the same process. If the needed database object is in neither the program nor the process cache, the facility retrieves the needed object from a database server and stores the retrieved database object in both the process cache and the program cache. In a preferred embodiment, as part of reading the database object from the database and copying to the process cache, additional database objects not requested are also read and copied to the process cache, allowing these additional objects to be quickly obtained from the process cache if they are needed for a subsequent transaction.

The facility purges any copies of a database object from all of these caches if notification is received from the database server that the object is being modified by another program, ensuring that any copies of database objects contained by a cache are identical to the database object stored in the database, which in turn ensures read-repeatable transaction isolation.

Access to the program cache and the process cache are each protected by a synchronization mechanism called a lock. As the program cache is accessed almost exclusively by its program, however, its program can obtain this lock quickly in most cases. Therefore, if the program cache is sufficiently large, the time cost of retrieving an object recently used by the same program from the program cache is very small. While the time cost of retrieving an object recently retrieved by a different program in the same process from the process cache is larger because all of the programs of the process can contend for the lock protecting access to the process cache, this time cost is still significantly smaller than the time cost of using a database server (which often executes on a different machine) to retrieve the object from the database.

FIG. 1 is an overview block diagram showing the network of computer systems that the facility preferably operates on. It can be seen from FIG. 1 that a network 199 connects a database server computer system 100 with a number of database-accessing computer systems, including database-accessing computer systems 130 and 160. The database computer system 100 maintains the contents of the database, and services requests from all of the database-accessing computer systems to retrieve an update object stored in the database. In a preferred embodiment, additional database server computer systems are connected to the network 199 (not shown) having replicated copies of the database to share the load on the database server computer system 100.

The database server computer system 100 is connected to the network 199 by a network connection 111. The database server computer system further contains an array of central processing units (CPUs) 101, 102, 103, and 104, having processor caches 106, 107, 108, and 109, respectively. The database 121 is stored by the database server computer system on a storage device 121, such as a redundant array of hard disk drives. The database server computer system 100 also contains main memory (memory) 112, which in turn contains database server programs 113 for accessing the database 122, as well as data 114 utilized by the database server programs 113.

A representative one of the database-accessing computer systems is discussed herein. The database-accessing computer system 130 is connected to the network 199 by a network connection 141. Database-accessing computer system 130 contains an array of processors 131, 132, 133, and 134, having processor caches 136, 137, 138, and 139, respectively. The database-accessing computer system further contains main memory (memory) 142. The memory 142 in turn contains a number of process address spaces, including process address spaces 145 and 146. The process address space 145 fully shown is representative of other process address spaces. It contains programs, including the facility 147 and database-accessing programs, such as database-accessing program A 148 and database-accessing program B 149. The process address space 145 further includes data 150 used by the programs of the process address space. The database-accessing computer system 130 further includes a removable media drive 159, which can be used to install software products, including the facility, which are provided on a computer-readable medium, such as a CD-ROM. While the facility is preferably implemented on the connected group of computer systems configured as described above, those skilled in the art will recognize that it may also be implemented on computer systems having different configurations. For example, some of the computer systems may not have features shown herein, or may have features not shown herein. Further, these features may preferably be embodied in other arrangements of computer systems, including being arranged in a single large computer system. Further, the network 199 may be any type of network, including the Internet, intranets, local area networks, wide area networks, and ad hoc systems of connections.

Figure 2:
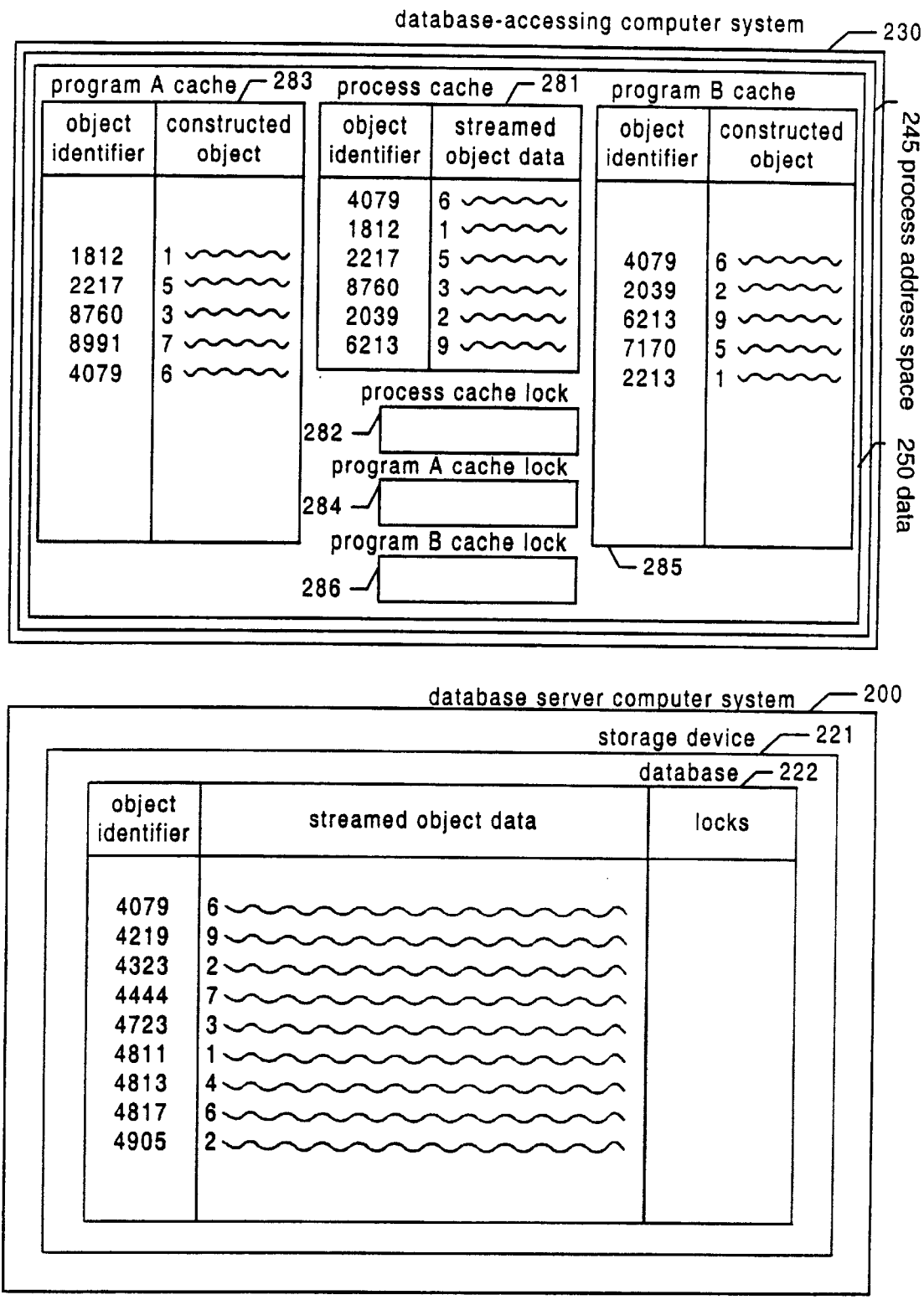
FIG. 2 is a memory diagram showing selective contents of the memories of a database-accessing computer system and the database server computer system.

FIG. 2 is a memory diagram showing selective contents of the memories of a database-accessing computer system and the database server computer system. FIG. 2 shows a portion of the data 250 in the process address space 245 in the memory of the database-accessing computer system 230. The data 150 includes a single process cache 281 having a lock 282. The facility uses the process cache 281 to cache database objects retrieved by any of the database-accessing programs executing in the process having process address space 245. The data 250 further includes a program cache for each data accessing program executing in this process: a program A cache 283 having a lock 284, and a program B cache 285 having a lock 286. Each cache is shown as a table that maps from object identifiers to data that comprises the object referenced by the object identifier. In each case, the existence of this data in a cache is a result of retrieving this data from the database. The caches shown differ from the actual caches preferably used by the facility in a number of minor respects to better illustrate their use by the facility. First, while object identifiers are shown as four-digit decimal numbers, the facility preferably uses object identifiers that are 32-digit hexadecimal numbers in order to ensure that the object identifiers uniquely identify the database objects to which they refer. Also, while the a mapped to from each object identifier may be thousands of bytes long, in each case only one decimal digit of the data is shown. Further, while the caches are shown as simple tables, they are preferably implemented as hash tables that hash from object identifiers to hash table slots containing pointers to the data comprising each object in a variable-length area of the cache. The caches each have a limited size, and preferably discard data that is old and/or no longer being used when their capacity is reached to make room for new data.

Each lock identifies the one thread currently having authority to read or modify the cache to which it corresponds. Each lock preferably contains the thread identifier of the thread having such authority, or a null thread identifier when no thread has such authority. The threads that may have authority to read and modify the shown caches include the threads executing each of the database-accessing programs executing in the process as well as the special thread used by the facility to flush modified database objects from the caches.

FIG. 2 further shows that the process cache 281 contains the data comprising the object in a compact, sequential "streamed" or "flat" form in which the contents of the object are stored in the database and communicated across the network. It can further be seen that the program caches 283 and 285 contain the data comprising each database object in a different "constructed" form, in which the database objects are usable by the accessing programs. This difference is discussed further below.

FIG. 2 also shows the database 222 stored in the storage device 221 of the database server computer system 200. The database 222 is shown as a table that maps object identifiers to the data comprising each database object in its streamed form, in which database objects may be transmitted over the network. The database 222 further contains indications of the read and write locks outstanding for each database object, which correspond to authority to read and write the database object, respectively, by database-accessing programs. For each valid object thereafter, the database 222 contains a row that maps from the object identifier to the database object referred to by the object identifier, thereby defining the site of database objects in the database. While the database 222 is shown as a simple table, because of its large size, it is preferably implemented using well-known advantageous indices. It should further be noted that the database 222 and the caches 281, 283, and 285 are shown with incomplete contents to better illustrate their use by the facility.

It can be seen by comparing program A cache 183 and program B cache 185 that objects having object identifiers "1812," "2217," "8760," and "8991" have recently been retrieved from the database by database-accessing program A, while database objects having object identifiers "4079," "2039," "6213," "7170," and "2213" have recently been retrieved from the database by database-accessing program B. It can further be seen that at least a subset of these objects have been stored in the process cache 281. In order to better describe the facility, its operation is discussed herein in conjunction with the series of examples relating to the data 250 shown in FIG. 2.

Figure 3:
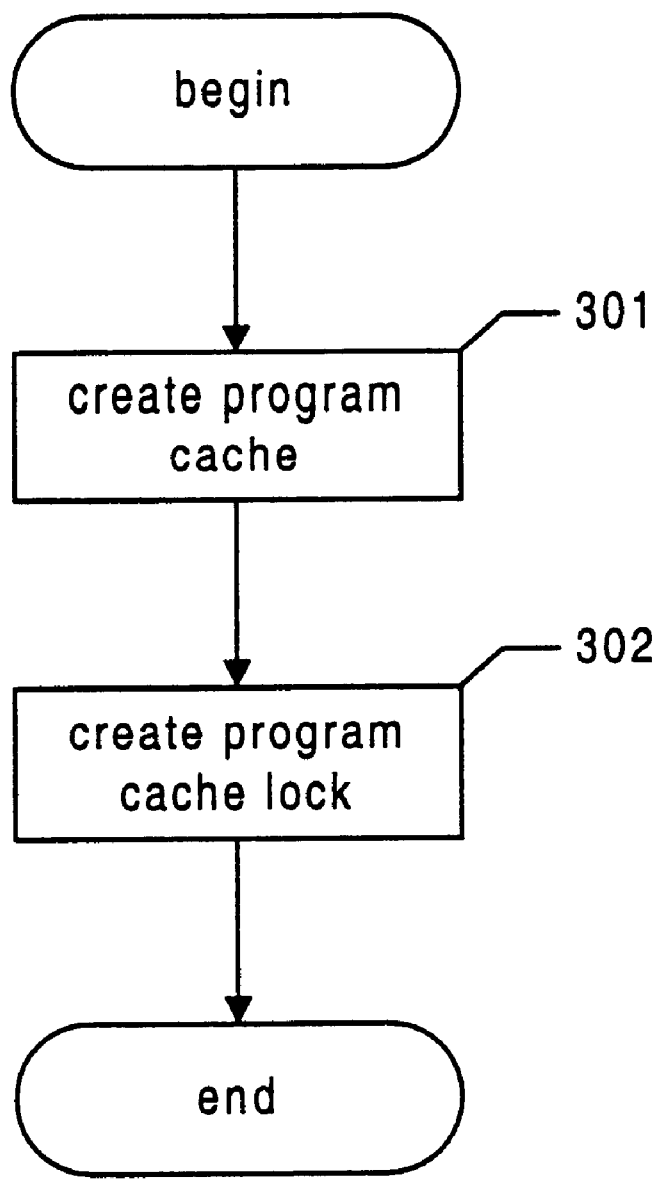
FIG. 3 is a flow diagram showing the steps preferably performed by the facility when a new database-accessing program begins executing in a particular process.

FIG. 3 is a flow diagram showing the steps preferably performed by the facility when a new database-accessing program begins executing in a particular process. These steps are preferably executed in the facility by the thread executing the new database-accessing program. In step 301, the facility creates a program cache for the database-accessing program, such as program A cache 283 (FIG. 2). In step 302, the facility creates a lock for the program cache, such as program A cache lock 284 (FIG. 2). Both steps 301 and 302 preferably involve allocating a required amount of free memory from the process address space for the process in which the database-accessing program is executing. The facility preferably selects the process in which to execute a new database-accessing program in order to group within the same process database-accessing programs likely to access a common group of database objects. These steps then conclude.

Figure 4:
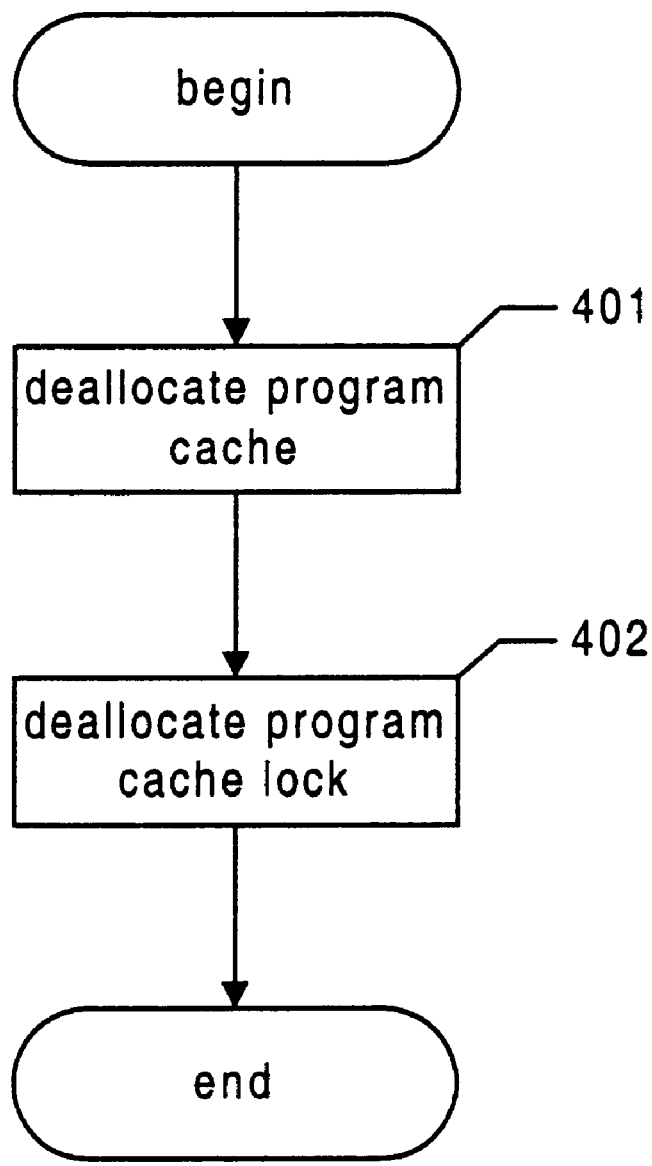
FIG. 4 is a flow diagram showing the steps preferably performed by the facility when a database-accessing program is being terminated.

FIG. 4 is a flow diagram showing the steps preferably performed by the facility when a database-accessing program is being terminated. These steps are preferably executed in the facility by the thread executing the database-accessing program being terminated. In step 401, the facility deallocates the memory allocated to the program cache for the database-accessing program. In step 402, the facility deallocates the memory allocated to the lock for the database-accessing program. These steps then conclude.

Figure 5:
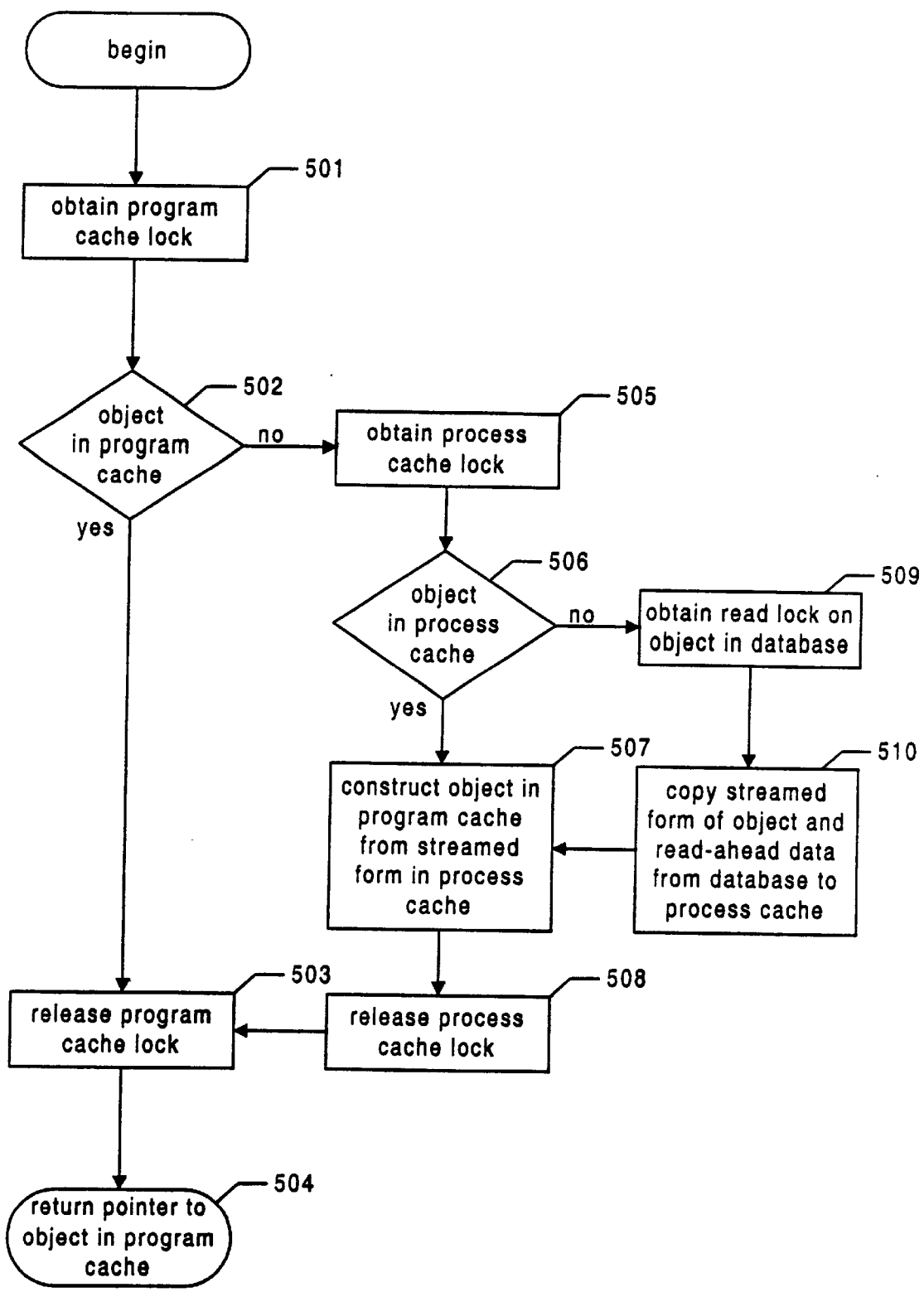
FIG. 5 is a flow diagram showing the steps preferably performed by the facility in order to obtain a database object using its object identifier.

FIG. 5 is a flow diagram showing the steps preferably performed by the facility in order to obtain a database object using its object identifier. These steps are preferably executed in the facility by a thread executing one of the database-accessing programs. In step 501, the facility obtains the lock 284 for the program cache 283. Step 501 preferably involves determining whether the lock presently contains a null thread identifier and, if so, writing the thread identifier with the current thread into the lock. If the lock does not currently contain a null thread identifier, the facility preferably waits until the lock contains a null thread identifier. The database-accessing program is executing on one of the processors 131–134 of the database-accessing computer system 130 (FIG. 1). The first time the database-accessing program obtains the program cache lock, the processor on which the database-accessing program is executing must retrieve the lock from main memory 142. Retrieving the lock from main memory 142 has a relatively high time cost, taking as much time on some processors as is required to execute about 90 instructions. However, as part of retrieving the lock from main memory, the processor stores the lock in its processor cache. For example, processor 131 would store the lock in its processor cache 136. Because the lock is now stored in the processor cache 136, subsequent attempts to obtain the lock by the processor 131 on behalf of this database-accessing program proceed much more quickly because the lock need only be retrieved from the processor cache 131 rather than main memory 142, and retrieval from the processor cache in some processors takes as little time as that required to execute 3 to 12 instructions.

In step 502, after obtaining the lock on the program cache, the facility determines whether the specified object identifier is in the program cache. If so, the facility continues in step 503, else the facility continues in step 505. In step 503, the specified object identifier and data for the database object referenced by the object identifier are already contained in the program cache. For example, program A cache 283 already contains object identifier "2217." In step 503, the facility releases the lock on the program cache. In step 504, the facility returns a pointer to the object in the program cache.

In step 505, the specified object identifier was not in the program cache. For example, object identifiers "2039" and "4444" are not contained in the program A cache 283 (FIG. 2). In step 505, the facility obtains the lock 281 on the process cache 282 (FIG. 2). Like the program cache lock, the process cache lock must be retrieved from main memory the first time it is obtained. Thereafter it is stored in the processor cache for the processor where it can be accessed quickly for subsequent attempts to obtain the lock by the same database-accessing program. The lock may, however, be migrated to the processor cache of another processor when a database-accessing program executing on the other processor needs to interact with the process cache.

In step 506, after obtaining the lock on the process cache, the facility determines whether the specified object identifier is in the process cache. If so, the facility continues in step 507, else the facility continues in step 509. In step 507, the specified object identifier is in the process cache. For example, the object identifier "2039" is in the process cache 281. In step 507, the facility uses the streamed form of the object stored in the process cache to construct the object in the program cache for the database-accessing program requesting to obtain the object so that the database-accessing program can interact with the database object and its program cache.

Figure 6:
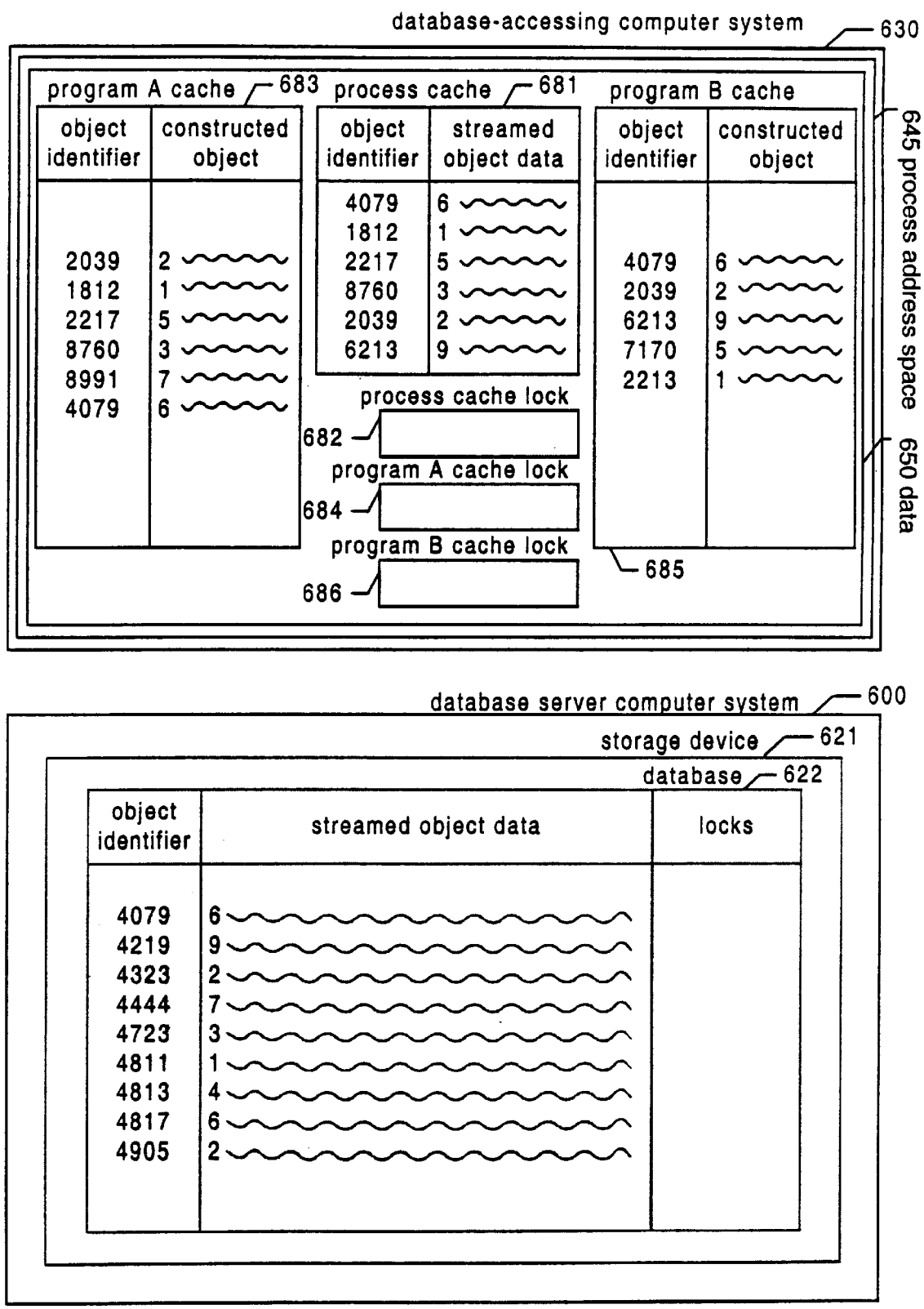
FIG. 6 is a memory diagram showing the results of performing step 507.

FIG. 6 is a memory diagram showing the results of performing step 507. It can be seen by comparing FIG. 6 to FIG. 2 that the facility has constructed the object referenced by object identifier "2039" in program A cache 683. Returning to FIG. 5, in step 508, the facility releases the lock 682 on the process cache 681 (FIG. 6). After step 508, the facility continues in step 503.

In step 509, the specified object identifier is in neither the program cache for the current database-accessing program nor the process cache, such as object identifier "4444." In step 509, the facility obtains a read lock on the object having the specified object identifier in the database. The database server preferably only permits the facility to obtain a read lock on the object if there are no outstanding write locks on the object. If the object has an outstanding write lock, the facility preferably waits in step 509 until the outstanding write lock is released. In step 510, after obtaining a read lock on the object in the database, a facility copies the streamed form of the object from the database 622 to the process cache 681 (FIG. 6). In step 510, the facility preferably further copies a body of read-ahead data from the database containing data comprising additional database objects whose object identifiers were not specified in the object retrieval request. This read-ahead data is preferably also stored in the process cache 681 (FIG. 6), so that future requests for the objects contained in the read-ahead data may be serviced from the process cache instead of incurring the cost of accessing the database server computer system across the network and obtaining a read lock on the database object in the database. While steps 509 and 510 as shown accurately portray the overall process of obtaining the object having the specified object identifier from the database, this process is further optimized in a preferred embodiment to account for the relatively large time cost involved in obtaining the object from the database. Because this process takes a relatively long period of time, the facility preferably releases the locks on the program cache and process cache while the retrieval from the database is taking place. Therefore, between steps 506 and 509, the facility releases the program cache lock and the process cache lock (not shown). In step 510, instead of copying the streamed form of the object directly to the process cache as shown, the facility preferably copies the streamed form of the object to a temporary location within the process address space. Then, between steps 510 and 507, the facility obtains the process cache lock, copies the streamed form of the object from the temporary location to the process cache, and obtains the program cache lock (not shown). This optimization allows other database-accessing programs to use the process cache during the retrieval operation. The optimization further allows the first steps shown in FIG. 13, described in detail below, to execute against both the process and program caches during the retrieval operation to remove from these cache objects that are about to be modified.

Figure 7:
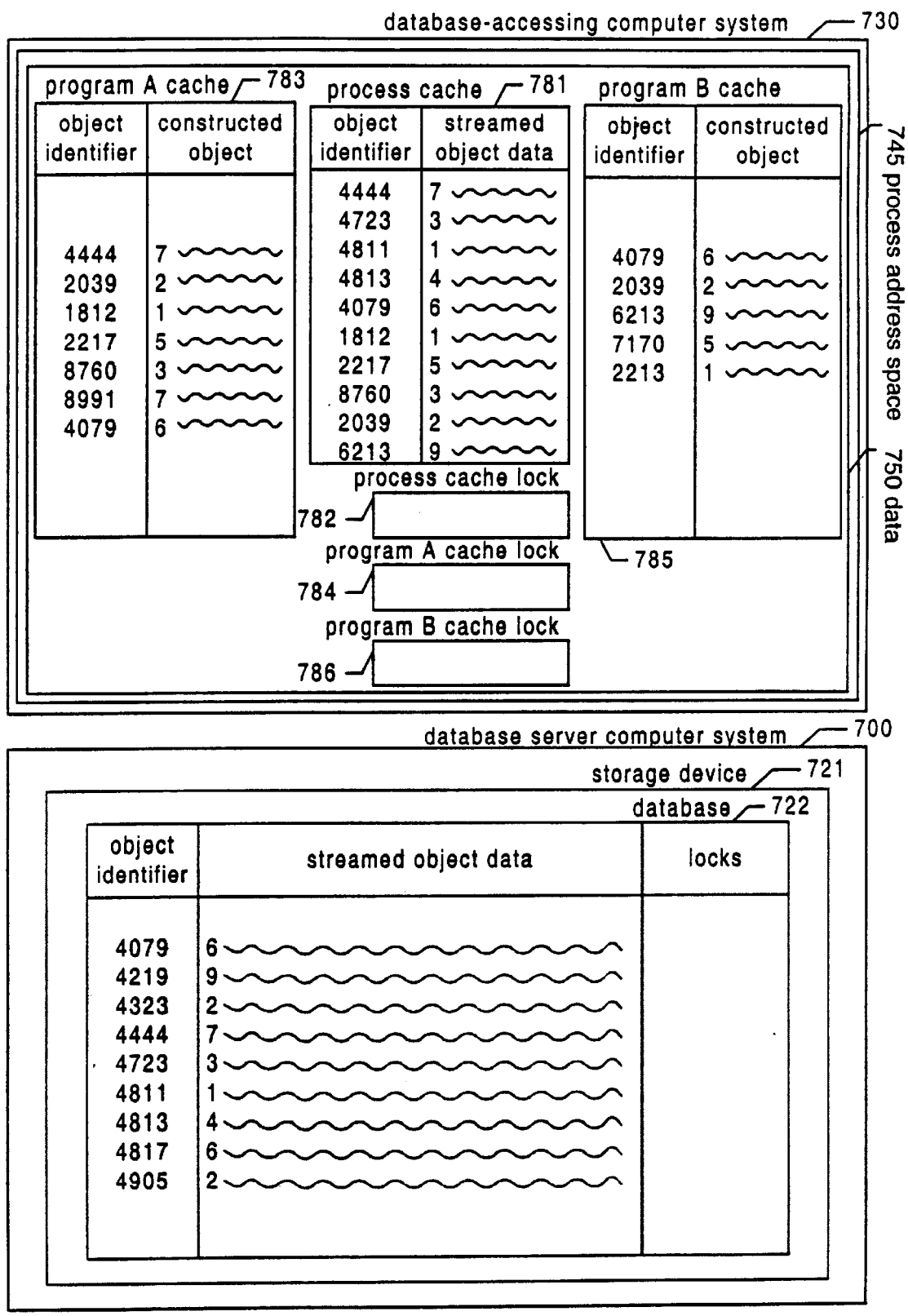
FIG. 7 is a memory diagram showing the results of performing steps 510 and 507.

After step 510, the facility continues in step 507 to construct the requested object in the program cache from the streamed form of the object copied into the process cache. The facility constructs objects when they are moved from the process cache to a program cache instead of when they are moved from the database to the process cache in part because of the copying of unrequested read-ahead data comprising additional objects to the process cache as part of retrieving the object from the database. Because objects are only constructed when moved to a program cache, the facility does not incur the overhead of constructing the additional objects until a database transaction needs the additional objects. FIG. 7 is a memory diagram showing the results of performing steps 510 and 507. It can be seen by comparing FIG. 7 to FIG. 6 that the facility has copied the streamed forms of the objects referenced by object identifiers "4444," "4723," "4811," and "4813" from the database 722 to the process cache 781. It can further be seen that the facility has constructed the object referenced by object identifier "4444" in the program A cache 783 using the streamed form of the object in the process cache 781.

Figure 8:
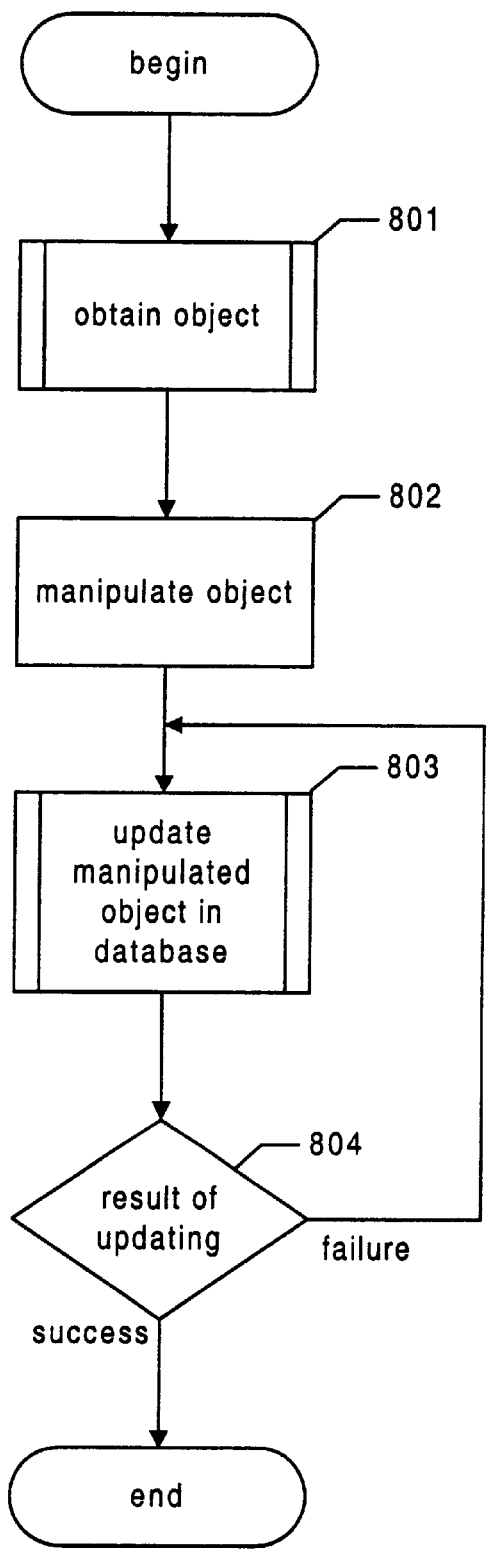
FIG. 8 is a flow diagram showing the steps preferably performed by the facility in order to update an object and preference by a specified object identifier.

In addition to obtaining database objects, database-accessing programs are preferably also able to modify database objects. FIG. 8 is a flow diagram showing the steps preferably performed by the facility in order to update an object and preference by a specified object identifier. These steps are executed in the facility by a thread executing the requesting database-accessing program. In step 801, the facility uses the specified object identifier to obtain the object as shown in FIG. 5. After step 801, a current constructed copy of the database object to be manipulated is stored in the program A cache 783, such as the database object referenced by object identifier "4079." In step 802, the facility manipulates the object in the program A cache 783.

Figure 9:
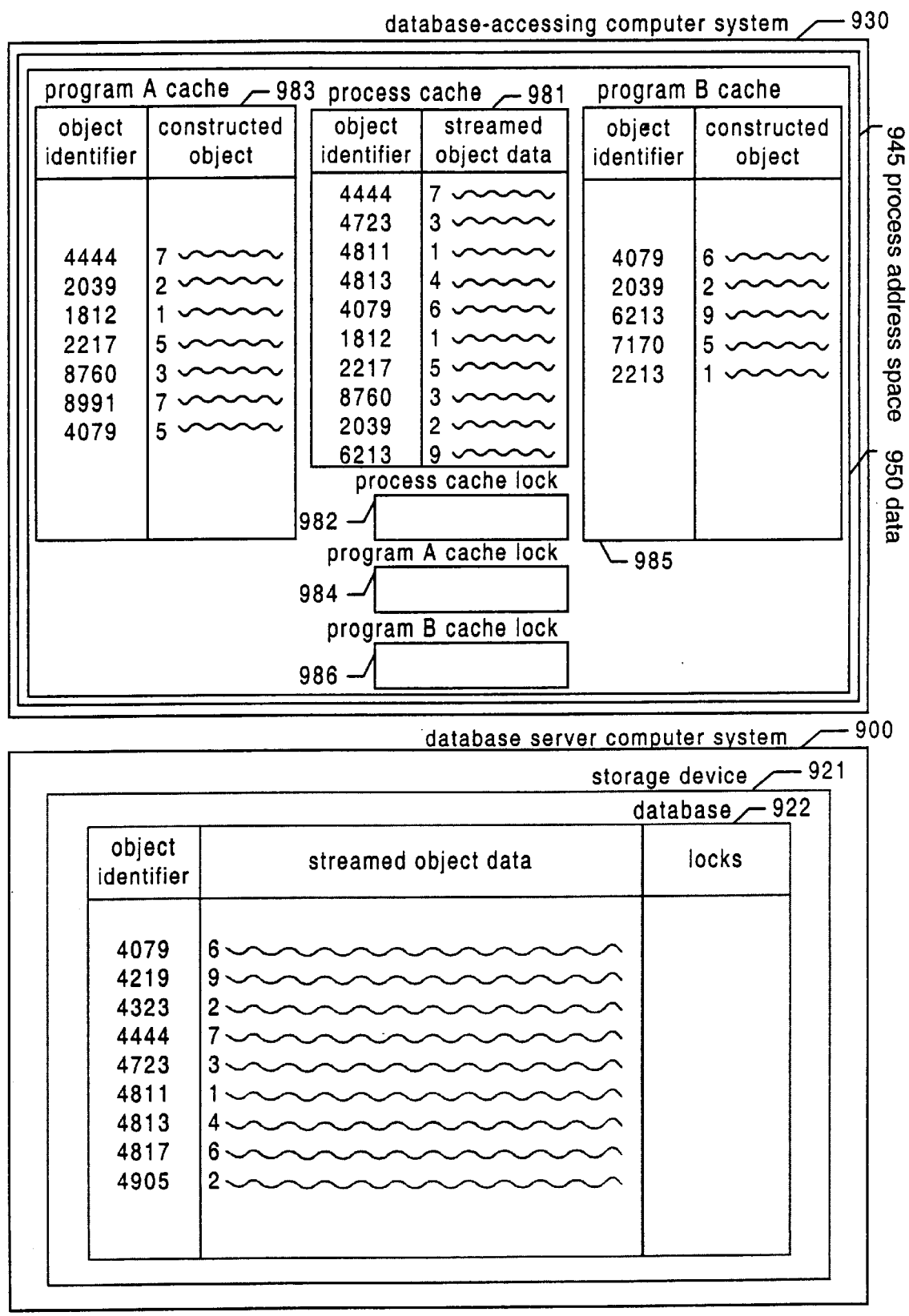
FIG. 9 is a memory diagram showing the results of performing step 802.

FIG. 9 is a memory diagram showing the results of performing step 802. It can be seen by comparing FIG. 9 to FIG. 7 that the facility has manipulated the object referenced by object identifier "4079" in the program A cache 983 by changing its first digit from a "6" to a "5." Returning to FIG. 8, in step 803, the facility updates the version of the object stored in the database, as well as any remaining cached versions of the object, to conform with the manipulations to the object in step 802. Step 803 is discussed in greater detail below in conjunction with FIG. 10. In step 804, if the object was successfully updated in the database, then these steps conclude, else the facility continues at step 803 to again attempt to update the object in the database. For example, the database server may not have been able to obtain a write lock for the database object.

Figure 10:
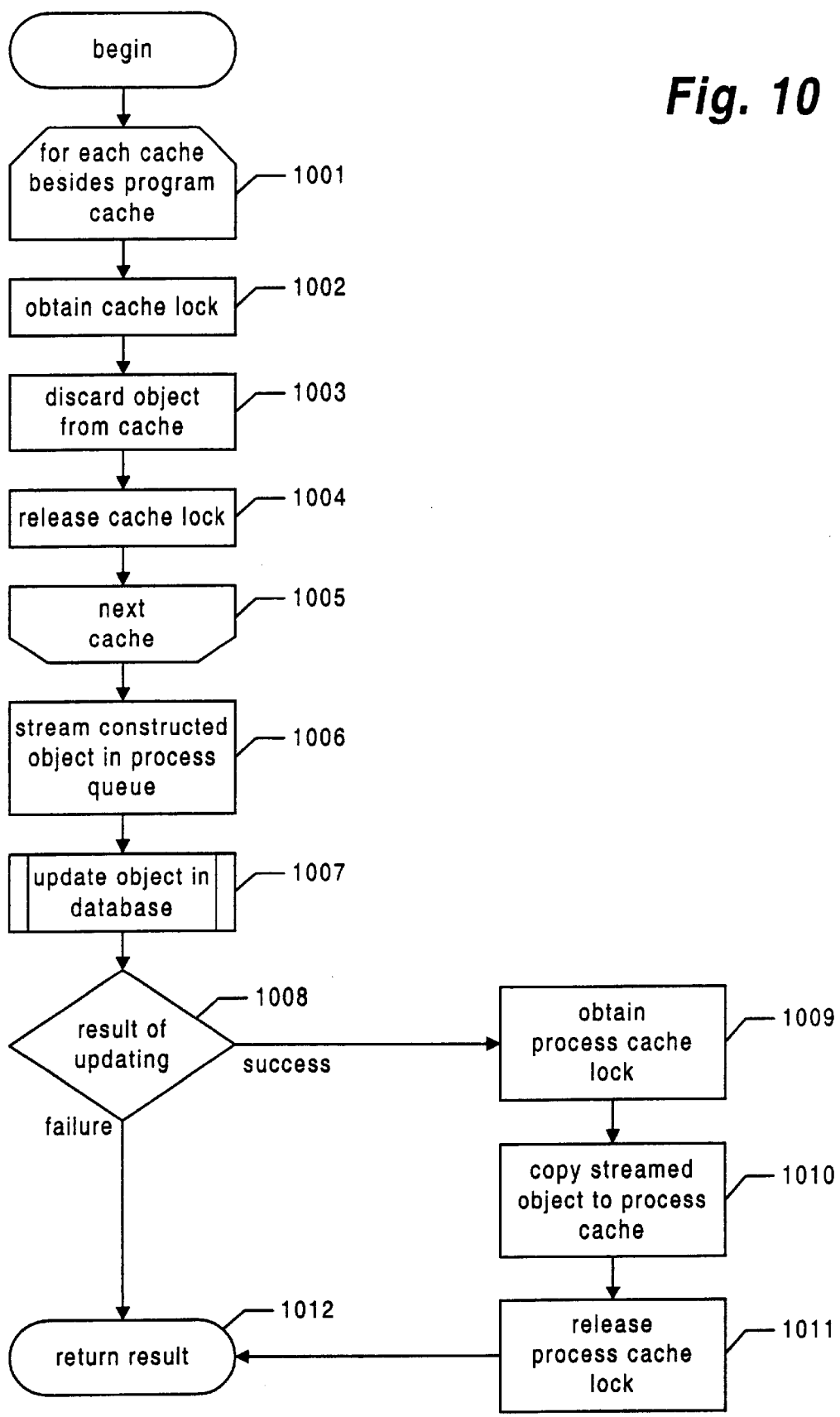
FIG. 10 is a flow diagram showing the steps preferably performed by the facility in order to update a manipulated object in the database.

FIG. 10 is a flow diagram showing the steps preferably performed by the facility in order to update a manipulated object in the database in accordance with step 803. In steps 1001–1005, the facility loops through each cache on a local computer system besides the program cache containing the manipulated object. In step 1002, the facility obtains a lock on the current cache. In step 1003, if the current cache contains a copy of the manipulated object, the facility discards the object from the cache. In step 1004, the facility releases the lock on the current cache. In step 1005, the facility loops back to step 1001 to process the next cache.

Figure 11:
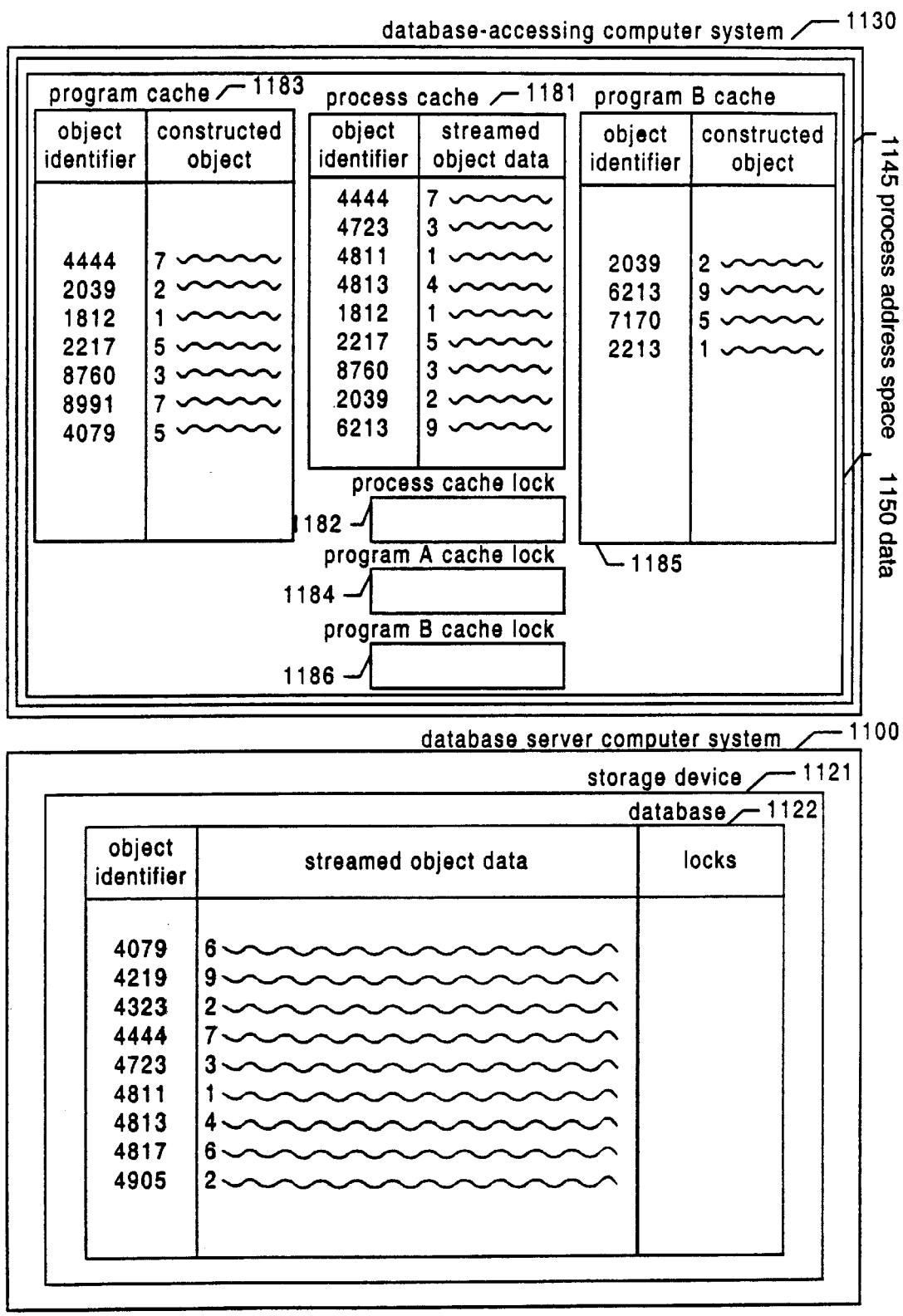
FIG. 11 is a memory diagram showing the results of performing steps 1001–1005.

FIG. 11 is a memory diagram showing the results of performing steps 1001–1005. It can be seen by comparing FIG. 11 to FIG. 9 that the facility has removed the database object referenced by object identifier "4079" from the process cache 1181, as well as from the program B cache 1185. Note, however, that the manipulated object referenced by object identifier "4079" is still contained in the program A cache 1183.

Returning to FIG. 10, after all the caches have been processed, the facility continues in step 1006. In step 1006, the facility creates a streamed version of the constructed object in the process cache that was manipulated in step 802 (FIG. 8). In step 1007, the facility causes the database server on the database server computer system to update the modified object in the database. Step 1007 preferably involves performing a remote procedure call from the database-accessing computer system to the database server computer system using known remote procedure call protocols. The remote procedure call preferably passes the streamed version of the manipulated object to the database server in the database server computer system.

Figure 12:
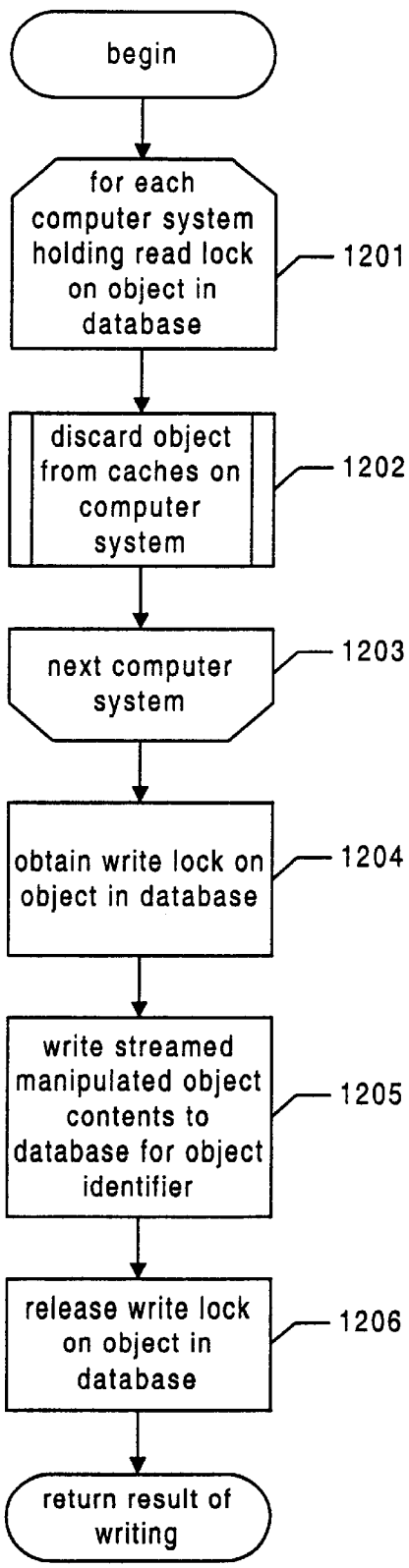
FIG. 12 is a flow diagram showing the steps preferably performed by the database server in order to update the version of the manipulated object stored in the database to reflect the manipulations to the manipulated object.

FIG. 12 is a flow diagram showing the steps preferably performed by the database server in order to update the version of the manipulated object stored in the database to reflect the manipulations to the manipulated object. The manipulated object is identified by a specified object identifier. In steps 1201–1203, the database server loops through each computer system holding a read lock on the object referenced by the specified object identifier in the database. In step 1202, the database server causes the facility on the current database-accessing computer system to discard from its caches any occurrences of the objects referenced by the object identifier. Step 1202 preferably involves invoking a remote procedure call to the facility of the current database-accessing computer system.

Figure 13:
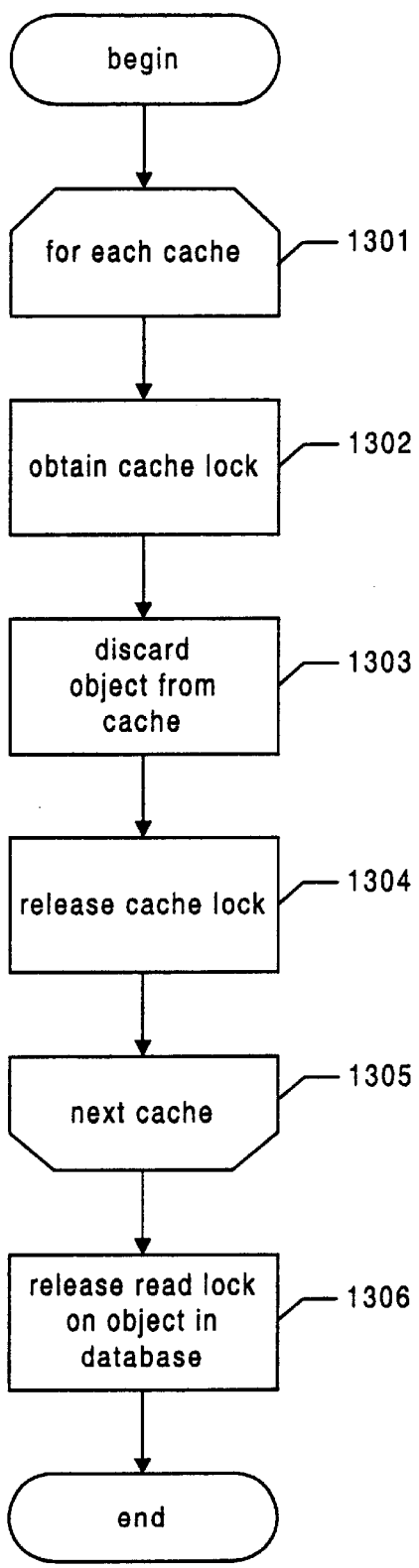
FIG. 13 is a flow diagram showing the steps preferably performed by the facility on a database-accessing computer system in response to the remote procedure call of step 1202.

FIG. 13 is a flow diagram showing the steps preferably performed by the facility on a database-accessing computer system in response to the remote procedure call of step 1202. In steps 1301–1305, the facility loops through each cache stored on the computer system. In step 1302, the facility obtains the lock on the current cache. In step 1303, if the object is present in the current cache, the facility discards it from the cache. In step 1304, the facility releases the lock on the current cache. In step 1305, the facility loops back to step 1301 to process the next cache on the machine. After all of the caches have been processed, the facility continues in step 1306. In step 1306, the facility releases any read locks it holds on the object in the database. These steps then conclude.

Returning to FIG. 12, in step 1203, the database server loops back to step 1201 to process the next database-accessing computer system. In step 1204, the database server obtains a write lock on the object referenced by the object identifier in the database. Step 1204 preferably involves determining that no read locks are outstanding for the database object, which should be true after the performance of steps 1201–1203. Step 1204 further requires that there be no outstanding write locks on the database object. In step 1205, the database server writes the streamed version of the manipulated object to the database for the specified object identifier.

FIG. 14 is a memory diagram showing the results of performing step 1205. It can be seen by comparing FIG. 14 to FIG. 11 that the facility has modified the object stored in the database for object identifier "4079" by changing the first digit from a "6" to a "5." Returning to FIG. 12, in step 1206, the database server releases the write lock on the object in the database. In step 1207, the database server returns an indication of whether the manipulated object was successfully written to the database. Step 1207 preferably involves returning the result to the facility on the database-accessing computer system manipulating the object using known remote procedure call protocols.

Figure 15:
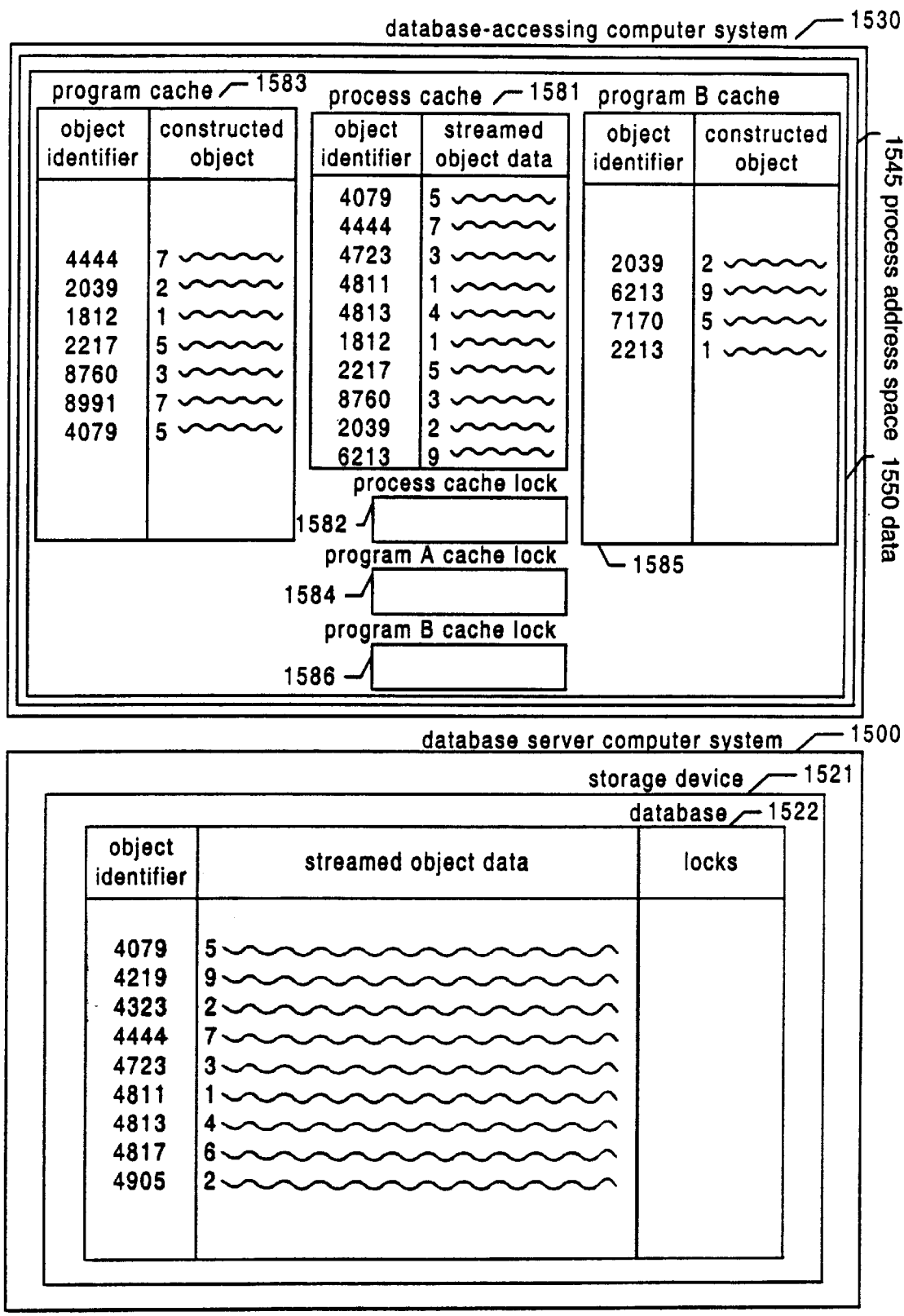
FIG. 15 is a memory diagram showing the results of performing step 1010.

Returning to FIG. 10, in step 1008, if the attempt to update the object in the database succeeded, then the facility continues in step 1009, else the facility continues in step 1012. In step 1009, the attempt to update the object in the database succeeded, and the facility obtains a lock 1482 on the process cache 1481 (FIG. 14). In step 1010, the facility stores the streamed object produced in step 1006 in the process cache 1481 (FIG. 14). FIG. 15 is a memory diagram showing the results of performing step 1010. It can be seen by comparing FIG. 15 to FIG. 14 that the facility has stored the manipulated version of the database object in the process cache 1581. In step 1011, the facility releases the lock 1482 on the process cache 1481. In step 1012, the facility returns the result of attempting to update the object in the database.

While the present invention has been shown and described with reference to preferred embodiments, it will be understood by those skilled in the art that various changes or modifications in form and detail may be made without departing from the scope of the invention. For example, the facility may utilize caches at additional levels of the cache hierarchy. For example, the facility may use a computer system cache on each database-accessing computer system to cache objects retrieved by any of the programs in any of the processes on the computer system. Further, the facility may use program group caches to cache objects retrieved by a subset of the programs in one process. The facility may further use different implementations of caches and databases than shown and discussed herein. Indeed, the facility may be gainfully applied to any type of transaction resource managers having concurrent distributed clients, not just to databases. For example, the facility may be applied to such transactional resource managers as a file system, which processes transactions against file system objects, and a compound document management system, which processes simultaneous transactions to modify sections of a compound document. Additionally, the facility may execute database-accessing programs in any number of processes. Also, the database server programs may execute on a data-accessing computer system instead of a dedicated database server computer system. Further, the facility may cache database objects obtained from more than one database server, either in a single combined cache or in separate, per-server caches.

We claim:

1. A method in a computer system for sharing a copy of a database object retrieved from a database server in response to a database transaction between a first program and a second program both executing in a process having an address space, the method comprising:

initiating the execution of the first and second programs within the process, such that both the first and second programs may access the address space of the process;

under the control of the first program, generating a first request for a specified database object;

delivering the first request to the database server;

receiving from the database server, in response to the delivered request, data for constructing the specified database object;

in response to the receiving step, constructing in the address space of the process a first copy of the specified object for use by the first program using the received data;

under the control of a second program, generating a second request for the specified database object; and in response to the generation of the second request, without delivering the second request to the database server, constructing in the address space of the process a second copy of the specified object for use by the second program using the received data.

2. A computer-readable medium whose contents cause a computer system to share a copy of a database object retrieved from a database server in response to a database transaction between a first program and a second program both executing in a process having an address space by:

initiating the execution of the first and second programs within the process, such that both the first and second programs may access the address space of the process;

under the control of the first program; generating a first request for a specified database object;

in response to the receiving step, constructing in the address space of the process a first copy of the specified object for use by the first program using the received data;

under the control of the second program, generating a second request for the specified database; and in response to the generation of the second request, without delivering the second request to the database server, constructing in the address space of the process a second copy of the specified object for use by the second program using the received data.

3. A method in a computer system for executing two database-transaction-issuing programs in the same process, wherein first and second database transactions both specify the retrieval of the same identified database object, the method comprising:

launching a first database-transaction-issuing program in the process;

under the control of the first database-transaction-issuing program, issuing the first database transaction;

terminating the first database-transaction-issuing program;

between the launch and termination of the first database-transaction issuing program:
      launching a second database-transaction-issuing program in the process;
      under the control of the second database-transaction-issuing program, issuing the second database transaction;

in response to issuing the first database transaction,
      retrieving the identified database object,
      storing the retrieved identified database object in a shared cache, and
      storing the retrieved identified database object for use by the first database transaction issuing program; and in response to issuing the second database transaction, copying the retrieved identified database object stored in the shared cache for use by the second database transaction issuing program.

4. The method of claim 1, further comprising:

establishing in the address space a first, second, and third cache, the first cache being available to both the first and second programs, the second cache being available only to the first program, the third cache being available only to the second program;

storing the received data in the first cache;

storing in the second cache the first copy of the specified object; and storing in the third cache the second copy of the specified object.

5. The computer-readable medium of claim 2 wherein the contents of the computer-readable medium further cause the computer system to perform:

establishing in the address space a first, second, and third cache, the first cache being available to both the first and second programs, the second cache being available only to the first program, the third cache being available only to the second program;

storing the received data in the first cache;

storing in the second cache the first copy of the specified object; and storing in the third cache the second copy of the specified object.

6. A computer-readable medium whose contents cause a computer system to execute two database-transaction-issuing programs in the same process, wherein first and second database transactions both specify the retrieval of the same identified database object, and wherein the contents of the computer-readable medium cause the computer system to perform the method of:

launching a first database-transaction-issuing program in the process;

under the control of the first database-transaction-issuing program, issuing the first database transaction;

terminating the first database-transaction-issuing program;

between the launch and termination of the first database-transaction-issuing program in the process;

launching a second database-transaction-issuing program in the process;

under the control of the second database-transaction-issuing program, issuing the second database transaction;

in response to issuing the first database transaction, retrieving the identified database object;

storing the retrieved identified database object in a shared cache, and storing the retrieved identified database object for use by the first database transaction issuing program; and in response issuing the second database transaction, copying the retrieved identified database object stored in the shared cache for use by the second database transaction issuing program.

7. An apparatus for executing database-transaction-issuing programs, wherein first and second database transactions both specify retrieval of the common identified database object, comprising:

a database-transaction-issuing subsystem adapted to issue database transactions under the control of database-transaction-issuing programs;

a processor adapted to execute a first database-transaction-issuing program and a second database-transaction-issuing program, the first database-transaction-issuing program executing between a first time and a second time and causing the database-transaction-issuing subsystem to issue the first database transaction between the first and second times, the second database-transaction-issuing program executing beginning at a third time between the first and second times and causing the database-transaction-issuing subsystem to issue the second database transaction between the third and second times;

one or more memories collectively containing working storage for the first database-transaction-issuing program, working storage for the second database-transaction-issuing program, and a shared cache; and a database-transaction-processing subject adapted to retrieve the identified database object, store the retrieved identified database object in the shared cache contained in the memories, and store the retrieved identified database object in the working storage for the first database-transaction-issuing program contained in the memories in response to the issuance of the first database transaction by the database-transaction-issuing subsystem, the database-transaction-processing subject being further adapted to copy the retrieved identified database object from the stored cache to the working storage for the second database-transaction-issuing program contained in the memories in response to the issuance of the second database transaction by the database-transaction-issuing subsystem.

* * * * *